United States Patent [19]

Ishida et al.

[11] Patent Number: 5,613,202
[45] Date of Patent: Mar. 18, 1997

[54] MOBILE STATION WITH FUNCTION WHICH ENABLES A USER TO EASILY RECOGNIZE A CURRENT POSITION

[75] Inventors: Takeshi Ishida; Noriko Norimatsu, both of Tokyo, Japan

[73] Assignee: NEC Corporation, Tokyo, Japan

[21] Appl. No.: 634,369

[22] Filed: Apr. 18, 1996

Related U.S. Application Data

[63] Continuation of Ser. No. 74,500, Jun. 11, 1993, abandoned.

[30] Foreign Application Priority Data

Jun. 11, 1992 [JP] Japan ................................. 4-177630

[51] Int. Cl.$^6$ ................................................. H04B 7/26
[52] U.S. Cl. ...................... 455/33.1; 455/38.4; 455/54.1; 455/89; 379/59
[58] Field of Search ................................. 455/33.1, 38.1, 455/38.4, 53.1, 54.1, 56.1, 89; 379/58, 59, 63; 342/451, 457; 364/460

[56] References Cited

U.S. PATENT DOCUMENTS

| | | | |
|---|---|---|---|
| 4,698,781 | 10/1987 | Cockerell, Jr. | 342/451 |
| 5,101,500 | 3/1992 | Marui | 455/33.1 |
| 5,155,689 | 10/1992 | Wortham | 364/460 |
| 5,305,466 | 4/1994 | Taketsugu | 455/54.1 |

FOREIGN PATENT DOCUMENTS

| | | |
|---|---|---|
| 0501058 | 9/1992 | European Pat. Off. . |
| 0526832 | 2/1993 | European Pat. Off. . |
| 072423 | 4/1986 | Japan ................. 455/33.1 |
| 0044929 | 2/1990 | Japan ................. 455/33.1 |
| 131131 | 6/1991 | Japan ................. 455/33.1 |

Primary Examiner—Edward F. Urban
Assistant Examiner—Thanh Le
Attorney, Agent, or Firm—Sughrue, Mion, Zinn, Macpeak & Seas

[57] ABSTRACT

In a mobile station for use in radio communication with a selected station selected from a plurality of base stations which are placed at different positions and which have station numbers, respectively, position data are previously memorized in an RAM (13) in a form in which the position data are dependent on the station numbers, respectively. The position data represent summary addresses of the positions, respectively. The selected station transmits a particular signal representative of a particular one of said station numbers. A CPU (12) reads, as a particular datum, one of the position data from the RAM in accordance with reception of the particular signal. The CPU makes an LCD (15) display the particular datum in response to operation of a keypad (16).

4 Claims, 6 Drawing Sheets

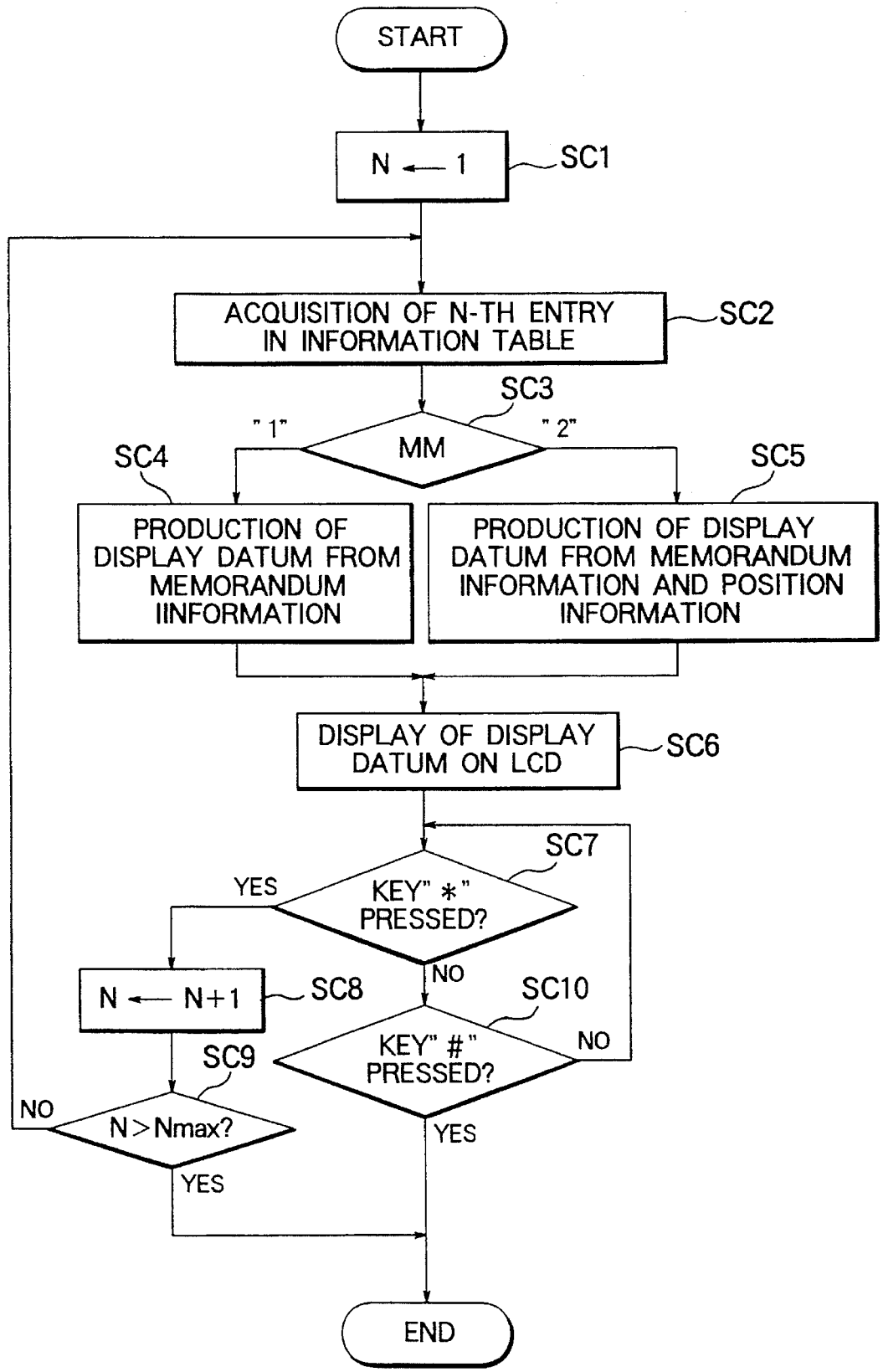
F I G. 6

MOBILE STATION WITH FUNCTION WHICH ENABLES A USER TO EASILY RECOGNIZE A CURRENT POSITION

This is a continuation of application Ser. No. 08/074,500, filed Jun. 11, 1993, now abandoned.

BACKGROUND OF THE INVENTION

This invention relates to a mobile station for use in a radio frequency communication system, such as a mobile telephone system and, in particular, to a mobile station with a position display function known in the art. The mobile station may be a portable telephone set although description will be mainly directed to an automobile telephone set.

A conventional mobile telephone system has a communication service area and comprises a plurality of base stations and a plurality of mobile telephone sets. The base stations are fixedly placed at different positions in the communication service area and are assigned with area numbers which will be called station numbers, respectively. Each of the base stations periodically transmits a particular signal representative of one of the assigned station numbers.

Each of the telephone sets is carried on movable bodies, such as an automobiles. When the movable bodies are in the communication service area, the telephone sets can communicate with a selected base station which is selected from the base stations in the manner known in the art.

Each of the telephone sets includes a display unit for displaying a display datum. Receiving the particular signal, each of the telephone sets makes the display unit display the assigned station number as the display datum.

With the mobile telephone system, a user of each of the telephone sets can recognize his current position with reference to the display unit if he has full knowledge of correspondence between each base station and each station number. This is because the assigned station number is displayed on the display unit.

However, if the user does not have such knowledge, he can not immediately recognize an actual position from the assigned station number that is displayed on the display unit.

SUMMARY OF THE INVENTION

It is therefore an object of the present invention to provide a mobile station with a function which enables a user to easily recognize a current position.

Other objects of this invention will become clear as the description proceeds.

A mobile station to which this invention is applicable is for use in radio communication with a selected station selected from a plurality of base stations. The base stations are placed at different positions and assigned with station numbers, respectively. The selected station transmits a particular signal representative of one of the assigned station numbers. The mobile station includes displaying means for displaying a display datum. According to this invention, the mobile station further comprises a position data memory for storing position data in a form in which the position data are dependent on the station numbers, respectively. The position data represents the positions, respectively. The mobile station further comprises particular reading means connected to the position data memory for reading, as a particular datum, one of the position data in accordance with the particular signal and particular making means connected to the displaying means and the particular reading means for making the displaying means display the particular datum as the display datum.

BRIEF DESCRIPTION OF THE DRAWING

FIG. 6 is a flow chart for describing a second mode of displaying operation of the mobile station illustrated in FIG. 1.

DESCRIPTION OF THE PREFERRED EMBODIMENT

For a better understanding of this invention, description will first be made as regards an automobile telephone system as an example of a radio frequency communication system. In the manner known in the art, the mobile telephone system has a communication service area and comprises a plurality of base stations and a plurality of automobile telephone sets. The base stations are fixedly placed at different positions in the communication service area and are assigned with station numbers, namely, area numbers, respectively. Each of the base stations periodically transmits a particular signal representative of one of the assigned station numbers.

The telephone sets are for use by subscribers or users and are carried on automobiles. When the automobiles are placed in the communication service area, the telephone sets can communicate with a selected base station which is selected from the base station in the manner known in the art.

Figure 1:
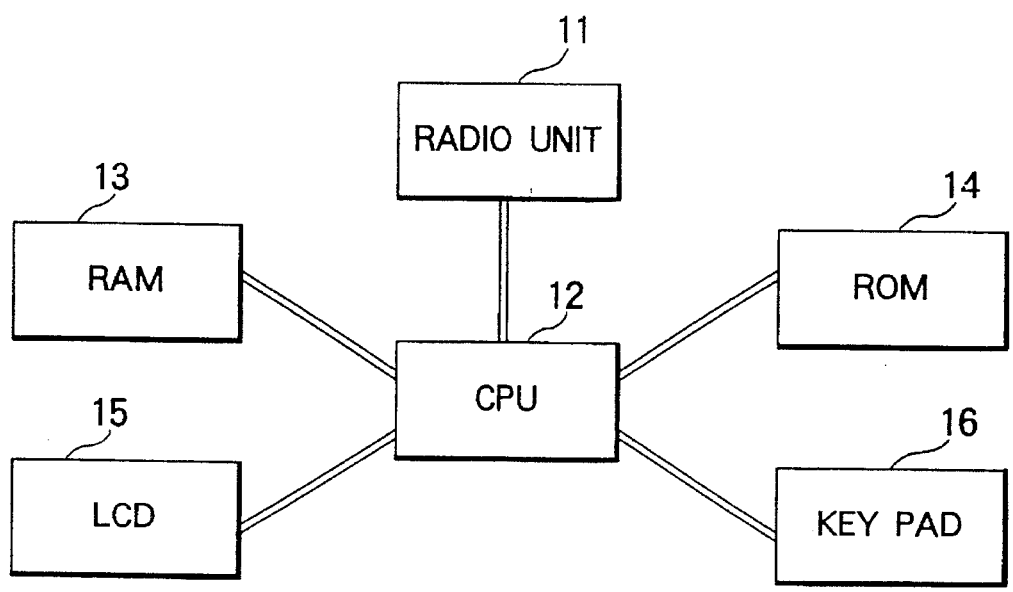
FIG. 1 is a block diagram of a mobile station according to an embodiment of this invention.

Referring to FIG. 1, the description will be directed to a mobile station according to an embodiment of the present invention. It will be assumed that the mobile station is one of the telephone sets. The mobile station comprises a radio unit 11 for carrying out transmission and reception of a radio signal with the selected base station, a central processing unit (CPU) 12, a random access memory (RAM) 13, a read only memory (ROM) 14 containing programs to be executed by the CPU 12, a liquid crystal display (LCD) 15, and a keypad 16 including number entry keys "0" through "9" and function keys such as "#" and "*". For simplification of the figure, omission is made as regards a handset or the like. The RAM 13 includes a first and a second memory area which will presently be described.

Figure 2:
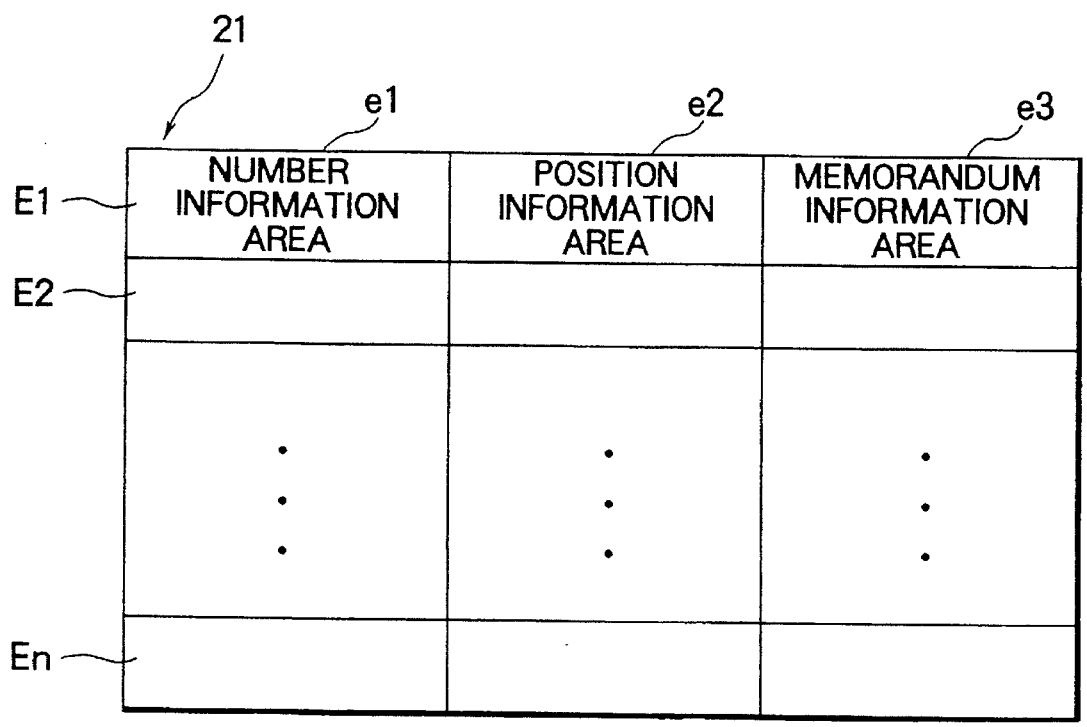
FIG. 2 shows a first memory area of a random access memory included in the mobile station illustrated in FIG. 1.

Turning to FIG. 2, the description will be directed to the first memory area of the RAM 13. The first memory area comprises an information table 21 having first through n-th entries E1 to En which are equal in number to the number of base stations. Each of the first through the n-th entries E1 to En comprises number information, position information, and memorandum information areas e1, e2, and e3. Each number information area e1 previously stores number information or a number datum representative of each of the area numbers. Each position information area e2 is referred to as a position data memory and previously stores position information or a position datum representative of a summary address of each of the base stations. The summary address will be called hereunder an area name. Each memorandum information area e3 will be referred to as a memorandum data memory and stores memorandum information or a memorandum datum which is supplied by the user in the manner which will later be described in detail. Each position information area e2 may store any other information, such as guide information relating to the area name, in addition to the area name.

Figure 3:
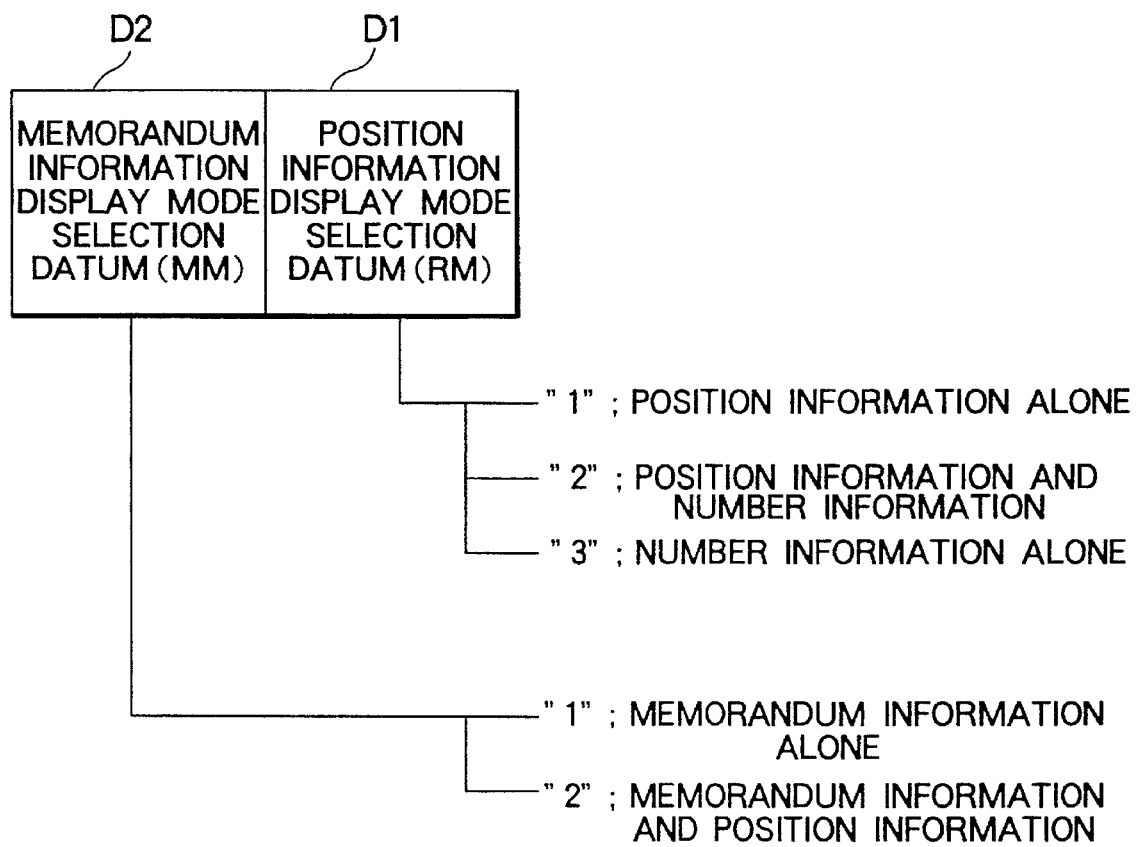
FIG. 3 shows a second memory area of the random access memory included in the mobile station illustrated in FIG. 1.

Turning to FIG. 3, the description will be directed to the second memory area of the RAM 13. The second memory area comprises first and second mode selection data areas D1 and D2. The first mode selection data area D1 is for storing a position information display mode selection datum RM which will be called hereunder a first mode selection datum. The second mode selection data area D2 is for storing a memorandum information display mode selection datum MM which will be called hereunder a second mode selection datum. Each of the first and the second mode selection data RM and MM can be changed by the user as will later be described.

The operation of the LED 15 will be briefly described. When the first mode selection datum RM represents "1", the LCD 15 displays the area name alone. When the first mode selection datum RM represents "2", the LCD 15 displays a combination of the area name and the area number. When the first mode selection datum RM represents "3", the LCD 15 displays the area number alone.

When the second mode selection datum MM represents "1", the LCD 5 displays the memorandum datum alone. When the second mode selection datum MM represents "2", the LCD 5 displays a combination of the memorandum datum and the area name.

Now, the operation of the mobile station will be described. It is assumed that the user simultaneously presses the keys "#" and "1" on the keypad 16. In this event, the CPU 12 will be referred to as a particular command signal producing arrangement and determines that a position display request is issued and starts a first mode of displaying operation of the mobile station.

Figure 4:
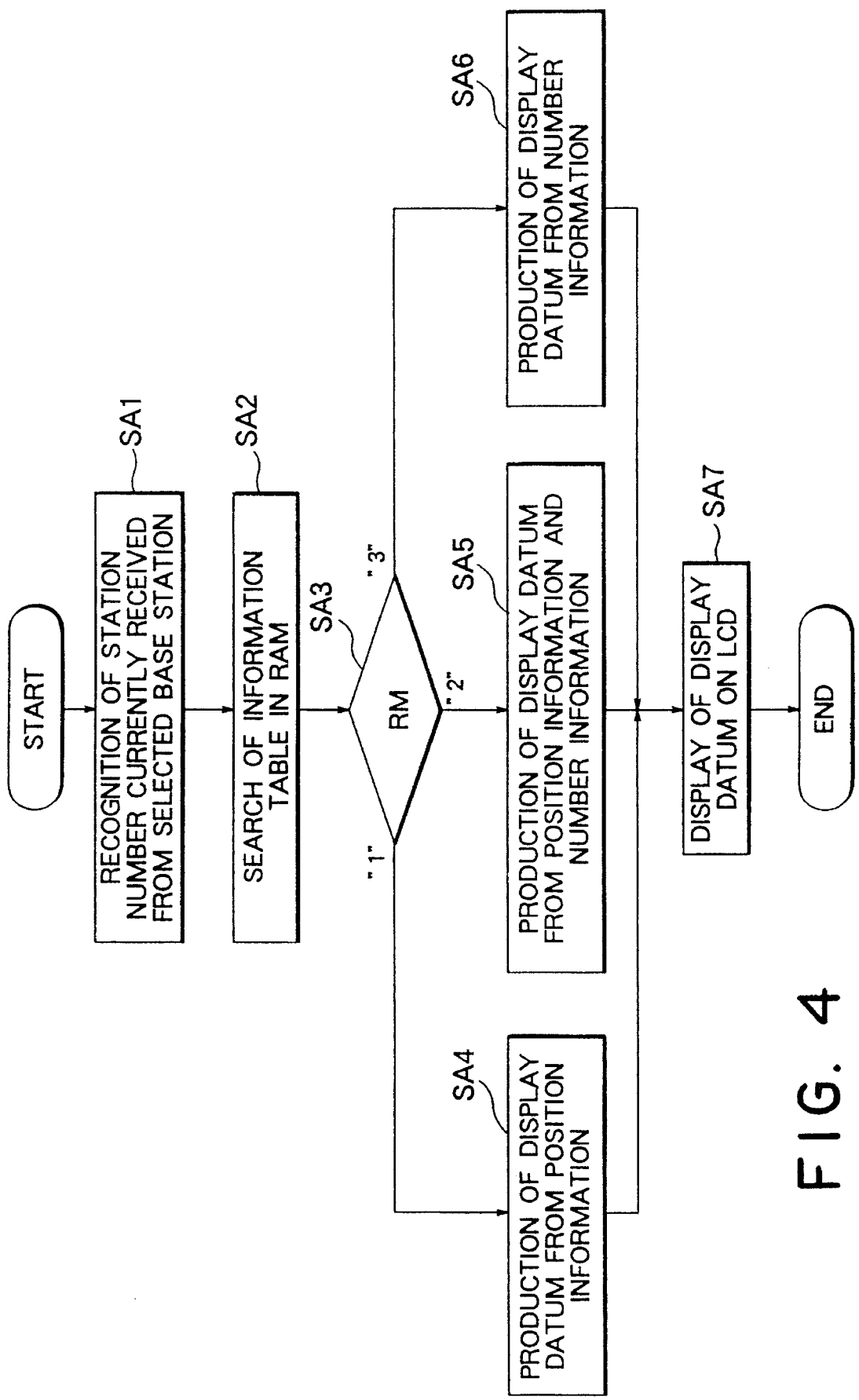
FIG. 4 is a flow chart for describing a first mode of displaying operation of the mobile station illustrated in FIG. 1.

Referring to FIG. 4, the description will be directed to the first mode. At a first stage SA1, the mobile station receives the particular signal that is currently transmitted from the selected base station or a nearest base station. Supplied through the radio unit 11 with the particular signal, the CPU 12 stores the area number that is represented by the particular signal as current area number in the RAM 13. When the position display request is issued, the current area number is recognized. In other words, recognition is made of the area number that is given to the selected base station.

The first stage SA1 is followed by a second stages SA2 at which the CPU 12 searches the information table 21 in the RAM 13 to read one of the first through the n-th entries E1 to En which has, in the number information area e1, the area number that is represented by the particular signal.

The second stage SA2 is followed by a third stage SA3 at which the CPU 12 executes a procedure depending on the first mode selection data RM in the RAM 13. When the first mode selection data RM represents "1", the third stage SA3 proceeds to a fourth stage SA4 at which the CPU 12 reads the position information from the position information area e2 of the acquired entry and stores it as a display datum or a particular datum in a local memory area of the RAM 13. When the first mode selection data RM represents "2", the third stage SA3 proceeds to a fifth stage SA5 at which the CPU 12 reads the position information and the area information number from the position information area e2 and the number information area e1 of the acquired entry and stores them as the display datum or the particular datum in the local memory area of the RAM 13. When executing each of the fourth and the fifth stages SA4 and SA5, the CPU is referred to as a particular reading arrangement.

When the first mode selection data RM represents "3", the third stage SA3 proceeds to a sixth stage SA6 at which the CPU 12 reads the area number from the number information area e1 of the acquired entry and stores it as the display datum or the particular datum in the local memory area in the RAM 13. Each of the fourth, the fifth, and the sixth stages SA4, SA5, and SA6 is followed by a seventh stage SA7 at which the display datum is displayed on the LCD 15.

Thus, when the first mode selection data RM represents "1" or "2", the CPU 12 makes the LCD 15 display the current position of the mobile station. In this event, the CPU 12 is referred to as a particular making arrangement. When the first mode selection data RM represents "3", the number information alone is displayed like the conventional system on the LCD 15.

While such information is displayed on the LCD 15, the user may simultaneously press, for example, the keys "1" and "2" on the keypad 16 in order to record something in relation to the current position. In this event, the CPU 12 determines that a memorandum information record request is issued and starts a memorandum information record process.

Figure 5:
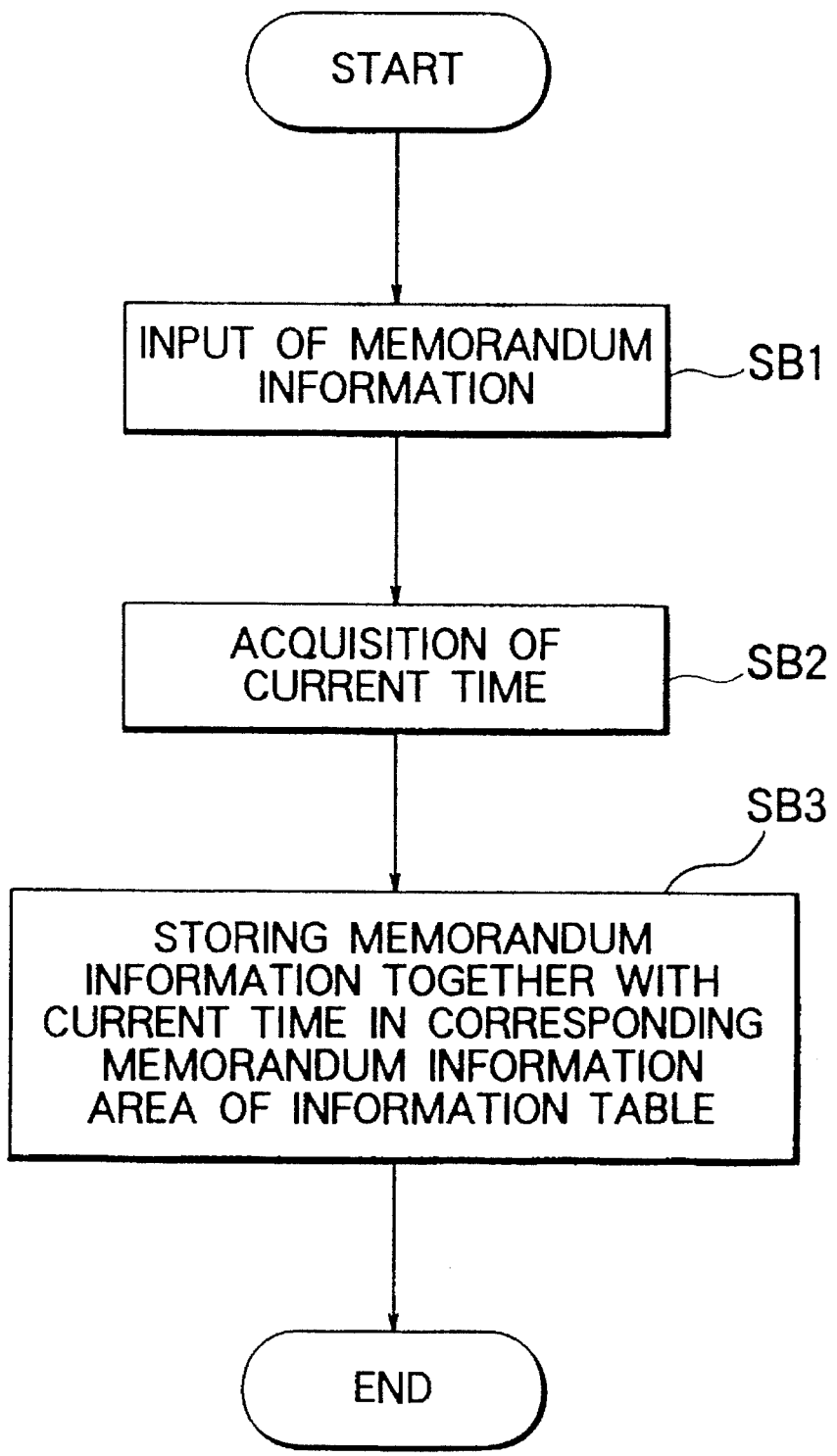
FIG. 5 is a flow chart for describing operation in which memorandum information is memorized in the first memory area illustrated in FIG. 2.

Referring to FIG. 5, the description will be directed to the memorandum information record process. At a first stage SB1, the user inputs through the keypad 16 numerals and alphabets, which are represented by combinations of the function keys and the number entry keys, as the memorandum information. At this time, the CPU 12 makes the LCD 15 display the memorandum information for a monitoring purpose.

Upon completion of the input of the memorandum information, the first stage SB1 is followed by a second stage SB2 at which the CPU 12 acquires the current time indicated by an internal timer which is included in the mobile station. The second stage SB2 is followed by a third stage SB3 at which the CPU 12 executes a storing operation as follows. With addition of the current time acquired at the second stage SB2, the memorandum information is stored in the memorandum information area e3 of the corresponding entry in the information table 21 of the RAM 13 illustrated in FIG. 2 (i.e., in the memorandum information area e3 of the entry) which has, in the number information area e1, the area number presently received. In this event, the CPU 12 will be referred to as a storing arrangement. Then, the memorandum information record process is finished at an end stage.

As described above, the user can record a brief memorandum in the RAM 13 of the mobile station at each position. The memorandum information can be displayed on the LCD 15 at any time afterward for confirmation.

Description will now be directed to operation of confirming the memorandum information. When the user simultaneously presses, for example, the keys "#" and "3" on the keypad 16, the CPU 12 determines that a memorandum information display request is issued and starts a second mode of displaying operation of the mobile station.

Referring to FIG. 6 the description will be directed to the second mode. At a first stage SC1, a pointer N for indicating one entry of the information table 21 in the RAM 13 is given a value "1". The first stage SC1 is followed by a second stage SC2 at which the first entry E1 of the information table 21 is acquired in accordance with the pointer N.

The second stage SC2 is followed by a third stage SC3 at which the CPU 12 determines the value of the second mode selection datum MM in the RAM 13 illustrated in FIG. 3. In this event, the CPU 12 will be referred to as a specific command signal producing arrangement. When the second mode selection datum MM represents "1", the third stage SC3 proceeds to a fourth stage SC4 at which the CPU 12 reads the memorandum information from the memorandum information area e3 of the acquired entry E1 and sets it as the display datum. When the second mode selection datum MM represents "2", the third stage SC3 proceeds to a fifth stage SC5 at which the CPU 12 reads the memorandum information and the position information from the memorandum and the position information areas e2 and e3 of the acquired entry E1 and sets them as the display datum. Each of the fourth and the fifth stages SC4 and SC5 will be referred to as a specific reading arrangement and is followed by a sixth stage SC6. At the sixth stage SC6, the CPU 12 makes the LCD 15 display the display datum. In this event, the CPU 12 will be referred to as a specific making arrangement.

Thus, when the second mode selection datum MM represents "1", the LCD 15 displays the memorandum information that is memorized in the entry E1 of the information table 21, namely, the memorandum information which is recorded while the user was present at the position corresponding to the area number memorized in the number information area e1 of the entry E1, together with the time information automatically added thereto.

When the second mode selection datum MM represents "2", the position information previously memorized in the information table 21 is also displayed in addition to the memorandum information accompanied with the time information.

After the above-mentioned display operation is carried out, the sixth stage SC6 is followed by a seventh stage SC7 at which a determination is made about whether or not the user presses, for example, the key "*" on the keypad 16. When the key "*" is pressed, the CPU 12 determines that another memorandum information display request for a next entry is issued. In this event, the seventh stage SC7 proceeds to an eighth stage SC8 at which the pointer N is increased by "1" to "2".

The eighth stage SC8 is followed by a ninth stage SC9 at which a determination is made about whether or not the pointer N is greater than a maximum value Nmax corresponding to the last entry En. When the pointer N is not greater than the maximum value Nmax, the ninth stage SC9 returns to the second stage SC2.

Thus, the display operation is successively carried out until the last entry En is displayed. When the pointer N exceeds the maximum value Nmax, the ninth stage SC9 proceeds to an end stage at which the CPU 2 finishes the display process of the memorandum information.

When the key "*" is not pressed, the seventh stage SC7 is followed by a tenth stage SC10 at which the CPU 12 determines whether or not the user presses the key "#" on the keypad 16. When the user presses the key "#" on the keypad 16, the tenth stage SC10 proceeds to the end stage at which the display process of the memorandum information is immediately interrupted. Otherwise, the tenth stage SC10 returns to the seventh stage SC7.

Next, the operation for determining each of the first and the second mode selection data RM and MM in the RAM 13 illustrated in FIG. 3 will be described. When the user simultaneously presses the keys "#" and "*" on the keypad 16, the CPU 12 determines that a mode selection data selection request is issued and starts a mode selection data selecting process.

Figure 7:
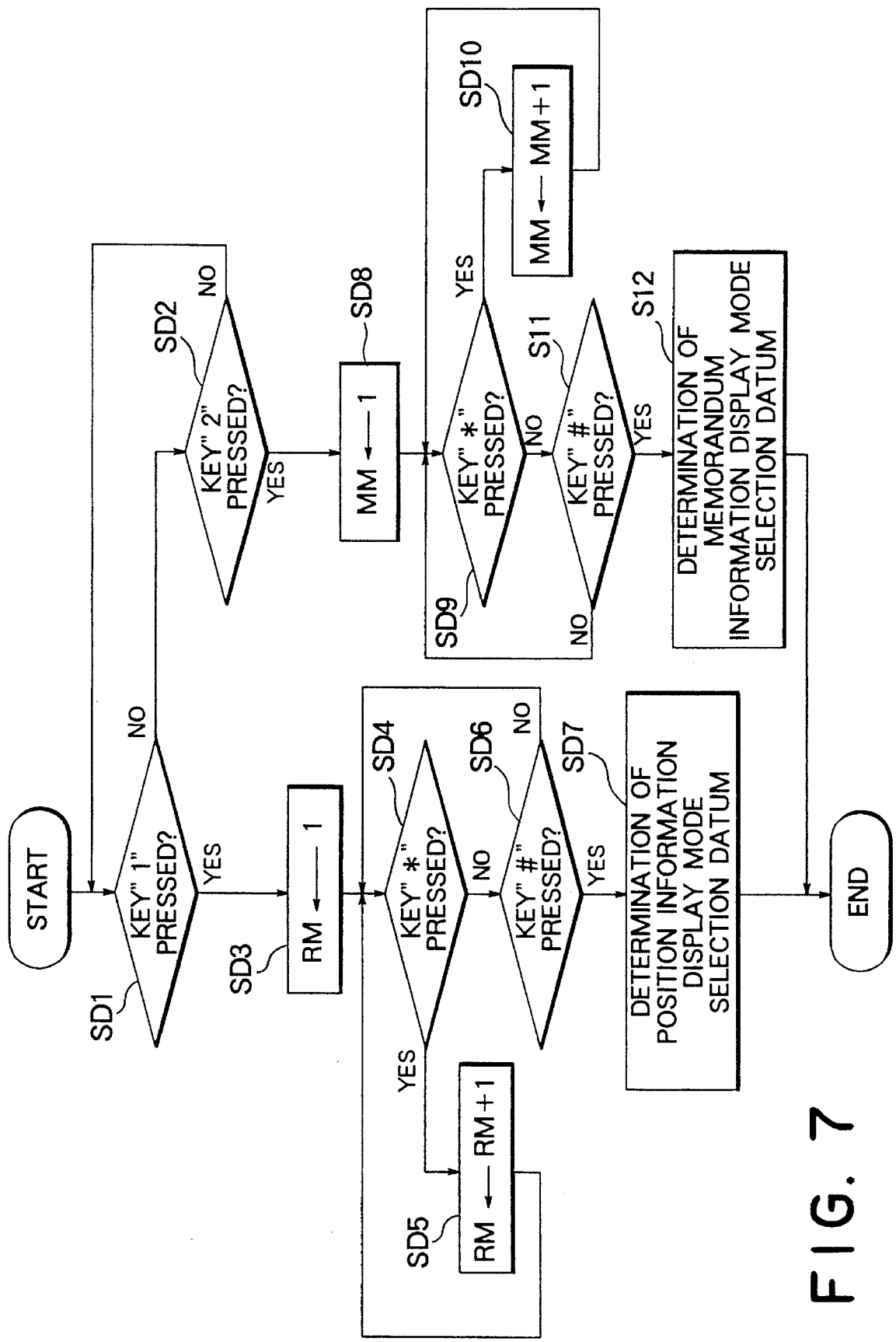
FIG. 7 is a flow chart for describing operation in which mode data are memorized in the second memory area illustrated in FIG. 3.

Referring to FIG. 7, the description will be directed to the mode selection data selecting process. The CPU 12 receives designation of the mode selection data which is a target of selection. At a first stage SD1, the CPU 12 judges whether or not the key "1" is pressed. When the key "1" is not pressed, the first stage SD1 proceeds to a second stage SD2 which will later be described.

When the key "1" is pressed at the first stage SD1, it is determined that the selection of the first mode selection datum RM is designated. In this event, the first stage SD1 proceeds to a third stage SD3 at which the LCD 5 displays "1" as to the first mode selection datum RM. The third stage SD3 is followed by a fourth stage SD4 at which determination is made about whether or not the key "*" is pressed. When the key "*" is pressed, the fourth stage SD4 proceeds to a fifth stage SD5. Otherwise, the fourth stage SD4 proceeds to a sixth stage SD6.

At a fifth stage SD5, the first mode selection datum RM is increased by one. As a result, the first mode selection datum RM becomes "2". However, if the first mode selection datum RM were "3" the first mode selection datum RM becomes "1". The fifth stage SD5 returns to the fourth stage SD4.

At the sixth stage SD6, a determination is made about whether or not the key "#" is pressed. When the key "#" is pressed, the sixth stage SD6 proceeds to a seventh stage SD7 at which the RAM 13 stores the first mode selection datum RM. Otherwise, the sixth stage SD6 returns to the fourth stage SD4.

At the second stage SD2, a determination is made about whether or not the key "2" is pressed. When the key "2" is pressed, a determination is made that the selection of the second mode selection datum MM is designated. In this event, the second stage SD2 proceeds to an eighth stage SD8. Otherwise, the second stage SD2 returns to the first stage SD1.

At the eighth stage SD8, the LCD 5 displays "1" as to the second mode selection datum MM. The eighth stage SD8 is followed by a ninth stage SD9 at which a determination is made about whether or not the key "*" is pressed. When the key "*" is pressed, the ninth stage SD9 proceeds to a tenth stage SD10. Otherwise, the ninth stage SD9 proceeds to an eleventh stage SD11.

At the tenth stage SD10, the second mode selection datum MM is increased by one. As a result, the second mode selection datum MM becomes "2". However, if the second mode selection datum MM is "2," the second mode selection datum MM becomes "1". The tenth stage SD10 returns to the ninth stage SD9.

At the eleventh stage SD11, a determination is made about whether or not the key "#" is pressed. When the key "#" is pressed, the eleventh stage SD11 proceeds to a twelfth stage SD12 at which the RAM 13 stores the second mode selection datum MM. Otherwise, the eleventh stage SD11 returns to the ninth stage SD9.

Thus, the user can selectively determines the first and the second display mode selection data RM and MM.

As described above, the telephone set with a position display function is capable of displaying the position information corresponding to the area number received from the nearest base station (i.e. the current position of the user). Accordingly, the user can know his location in an unfamiliar area.

In addition, it is possible to record a brief memorandum in the telephone set in each area, if desired. Furthermore, it is possible to display, at any time afterward, the stored memorandum or a combination of the memorandum, the position information, and the time instant when the memorandum was stored. Thus, it is possible to effectively utilize the telephone set as a memo pad.

While the present invention has thus far been described in connection with only a single embodiment thereof, it will readily be possible for those skilled in the art to put this invention into practice in various other manners. For example, it is possible to modify the structure so as to designate, together with the position display request and the memorandum information display request, whether either one or both of the area number and the position information is to be displayed upon the first mode and whether or not the position information is to be displayed upon the second mode in addition to the memorandum information.

What is claimed is:

1. A mobile station for use in radio communication with a selected station selected from a plurality of base stations which are placed at different positions and which are assigned with station numbers, respectively, said selected station transmitting a particular signal representative of an assigned one of said station numbers, said mobile station including displaying means for displaying a display datum, said mobile station further comprising:

a position data memory for storing position data in a form in which said position data are dependent on said station numbers, respectively, said position data representing said positions, respectively;

particular reading means connected to said position data memory for reading, as a particular datum, one of said position data in accordance with said particular signal; and particular making means connected to said displaying means and said particular reading means for making said displaying means display said particular datum as said display datum, said particular making means comprising:

a local memory connected to said particular reading means for storing said particular datum;

particular command signal producing means for producing a particular command signal; and means connected to said local memory and said displaying means and said particular command signal producing means for making said displaying means display said particular datum as said display datum in response to said particular command signal.

2. A mobile station as claimed in claim 1, further comprising:

a memorandum data memory for storing memorandum data;

storing means connected to said memorandum data memory for storing each of said memorandum data in said memorandum data memory in a form in which each of said memorandum data is dependent on each of said station numbers;

specific reading means connected to said memorandum data memory for reading, as a specific datum, one of said memorandum data; and specific making means connected to said displaying means and said specific reading means for making said displaying means display said specific datum as said display datum.

3. A mobile station for use in radio communication with a selected station selected from a plurality of base stations which are placed at different positions and which are assigned with station numbers, respectively, said selected station transmitting a particular signal representative of an assigned one of said station numbers, said mobile station including displaying means for displaying a display datum, said mobile station further comprising:

a position data memory for storing position data in a form in which said position data are dependent on said station numbers, respectively, said position data representing said positions, respectively;

particular reading means connected to said position data memory for reading, as a particular datum, one of said position data in accordance with said particular signal; and particular making means connected to said displaying means and said particular reading means for making said displaying means display said particular datum as said display datum;

a memorandum data memory for storing memorandum data;

storing means connected to said memorandum data memory for storing each of said memorandum data in said memorandum data memory in a form in which each of said memorandum data is dependent on each of said station numbers;

specific reading means connected to said memorandum data memory for reading, as a specific datum, one of said memorandum data; and specific making means connected to said displaying means and said specific reading means for making said displaying means display said specific datum as said display datum; and specific command signal producing means connected to said specific reading means for producing a specific command signal to make said specific reading means read, as said specific datum, one of said memorandum data in response to said specific command signal.

4. A mobile station as claimed in claim 3, wherein said particular making means comprises:

a local memory connected to said particular reading means for storing said particular datum;

particular command signal producing means for producing a particular command signal; and means connected to said local memory and said displaying means and said particular command signal producing means for making said displaying means display said particular datum as said display datum in response to said particular command signal.

* * * * *